INVENTORS
WILLIAM A. WISEMAN
JOHN L. WALKER

BY *Hauke, Kraus, & Gifford*
ATTORNEYS

3,447,515
ENGINE GEARING ARRANGEMENT
William A. Wiseman, Muskegon, and John L. Walker,
North Muskegon, Mich., assignors to Continental Motors Corporation, Detroit, Mich., a corporation of Virginia
Filed July 3, 1967, Ser. No. 651,351
Int. Cl. F01b 1/08, 23/00
U.S. Cl. 123—90                          5 Claims

ABSTRACT OF THE DISCLOSURE

A crankshaft gearing arrangement for an internal combustion engine having a first gear means coupling the forward end of the crankshaft to a coaxially mounted propeller shaft and camshaft and a second gear means drivingly coupling the rearward end of the crankshaft to a transversely mounted accessory driveshaft.

BACKGROUND OF THE INVENTION

Field of the invention

This invention relates to internal combustion engines and more specifically to a crankshaft gearing arrangement for such engines having a common gear means driving both the main output shaft and the camshaft from the forward end of the crankshaft and a second gear means driving the engine accessories from the rearward end of the crankshaft.

Description of the prior art

Conventional internal combustion engines employ a reduction gear connected to the forward end of the crankshaft for driving an output shaft which in the case of an aircraft engine is the propeller shaft. A crank gear is mounted on the rear end of the crankshaft in driving mesh with a complementary gear on a camshaft. An accessory gear train is also conventionally driven from the rear end of the crankshaft to drive the basic accessories such as the magnetos, the starter, the oil and fuel pumps and the like. Various forms of this conventional gearing arrangement require from 13 to as high as 42 basic gears to perform a comparable function.

It is the broad purpose of the present invention to reduce the weight and cubic feet per horsepower required in an internal combustion engine by providing an improved crankshaft gearing arrangement which performs the same basic functions as conventional engines but with only 7 basic gears.

SUMMARY

The preferred embodiment of the present invention, which will be subsequently described in greater detail, is described with reference to a four-cylinder horizontally opposed aircraft engine. However, it is to be understood that the preferred crankshaft gearing arrangement can be incorporated in internal combustion engines employed in a wide variety of applications to produce a shorter, lighter-weight and more compact power plant.

The preferred embodiment comprises an engine crankshaft mounted within a split crankcase with a hydraulic coupling connecting the forward end of the crankshaft to a forward extending quill shaft. A propeller shaft mounted above the crankshaft for rotation about an axis parallel to the axis of rotation of the crankshaft is connected to the camshaft of the engine so that the propeller shaft and the camshaft rotate as a unit about a common axis.

A pair of gears connecting the quill shaft to the propeller shaft provide means for rotating both the propeller shaft and the cam shaft through a common gear set. Thus, the crankshaft can be driven at a very high r.p.m. with a single gear means for reducing rotational output of the crankshaft down to a speed compatible for both the propeller shaft and the camshaft. Assuming a two-to-one gear reduction ratio, a four-cycle engine having a crankshaft rotating at 4,000 r.p.m. has a propeller shaft output of 2,000 r.p.m. which is also the cam shaft rotation.

An accessory driveshaft is supported by the crankcase rearwardly of the crankshaft for rotation about an axis perpendicular to the axis of rotation of the crankshaft. A bevel gear set connects the output of the crankshaft to the accessory drive shaft which, in turn, is drivingly connected to a pair of accessories, one associated with each of its opposite ends. The accessories are integrally mounted to the crankcase and extend laterally with respect to the longitudinal axis of the engine. This arrangement has two advantages, first, a single accessory driveshaft functions as a common driving element for each pair of accessories thereby reducing the overall number of driving elements by one-half, and, secondly, the overall length and size of the engine is reduced by eliminating the external connections between the engine and the basic accessories. An intermediate driveshaft and an upper accessory driveshaft are mounted to the crankcase and geared to the primary driveshaft so that each shaft provides a common driving connection for a pair of laterally mounted accessories such as the magnetos, the fuel pump, the vacuum pump, the oil pump, and the like.

Thus, by driving the output shaft and the camshaft through a common pair of gears connected to the forward part of the crankshaft and by the simplified gearing arrangement for driving the accessories with three cross shafts, each cross shaft driving two or more accessories, a simplified crankshaft gearing arrangement that performs all the functions of conventional gearing arrangements with only seven gears provides a means for producing a low weight and high power engine. This gearing arrangement can be employed in a family of engines having low vibration and smooth operating characteristics.

It is therefore an object of the present invention to reduce the weight per horsepower of internal combustion engines by reducing the components necessary in the crankshaft gearing arrangement by providing a crankshaft having a forward gear means driving an interconnected output shaft and camshaft, and rear gear means driving an accessory gear train.

It is another object of the present invention to reduce the number of gears necessary in a crankshaft gearing arrangement by driving both the output shaft and the camshaft through a common set of reduction gears coupled to the crankshaft.

It is a still further object of the present invention to reduce the overall size of internal combustion engines per horsepower by providing an improved crankshaft gearing arrangement wherein the accessory drive train is arranged to drive laterally extending accessories integrally mounted to the engine crankcase.

Still further objects and advantages of the present invention will readily occur to one skilled in the art to which the invention pertains upon reference to the following detailed description.

Description of the drawings

The description refers to the accompanying drawings in which like reference characters refer to like parts throughout the several views and in which.

Description of the preferred embodiment

Figure 3:
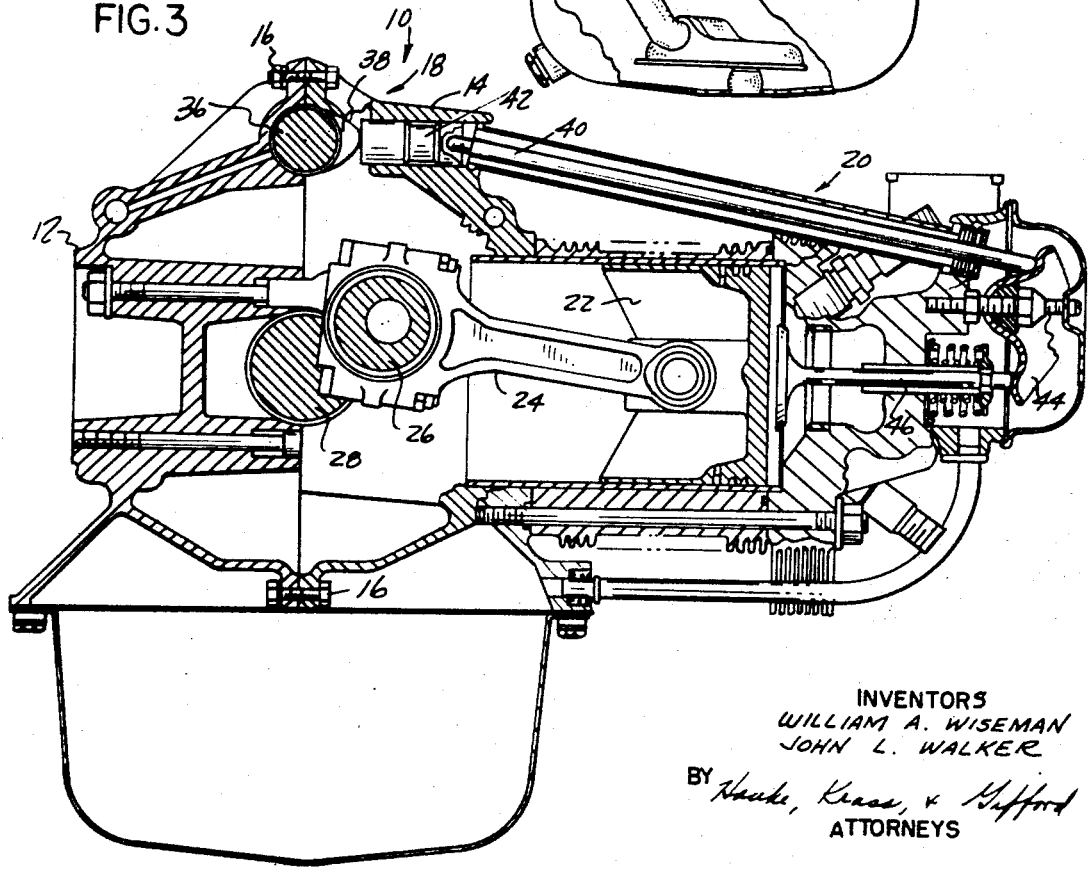
FIG. 3 is a transverse sectional view as seen along lines 3—3 of FIG. 1.

Now referring to the drawing, a preferred engine is illustrated in FIG. 3 at 10 as comprising a pair of crankcase halves 12 and 14 which are joined together by threaded fasteners 16 to form a crankcase assembly 18. The crankcase assembly 18 is preferably formed by a pair of longitudinally, vertically split halves, with each of the crankcase halves 12 and 14 supporting a pair of horizontally mounted cylinder assemblies. A typical cylinder assembly 20 is illustrated in FIG. 3.

A piston 22 is reciprocally mounted within the cylinder assembly 20 and is connected by an arm 24 to a crank pin 26 which forms a part of a longitudinally mounted crankshaft 28.

Figure 1:
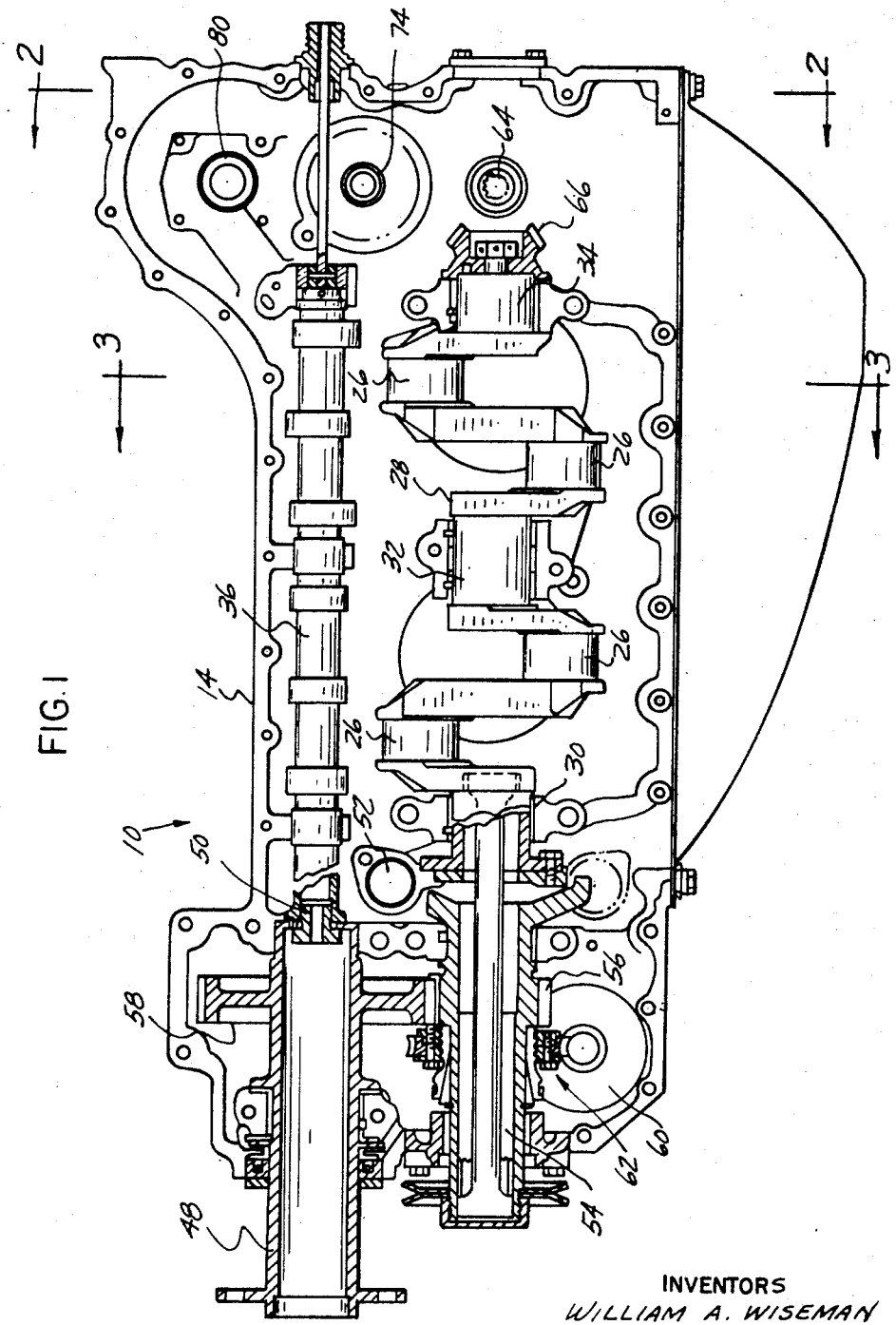
FIG. 1 is a longitudinal sectional view through a 4-cylinder engine having horizontally mounted cylinders with parts removed for purposes of clarity and illustrating the preferred embodiment of the present invention.

As best seen in FIG. 1, the crankshaft 28 has four crank pins each of which is associated wih an engine cylinder. The crankshaft 28 is supported for rotation by a forward bearing means 30, an intermediate bearing means 32 and a rearward bearing means 34, each of the bearing means being supported in axially aligned relationship by the crankcase halves 12 and 14.

An overhead mounted camshaft 36 is also supported by the crankcase 18 for rotation about an axis parallel to the axis of rotation of the crankshaft 28 and as can best be seen in FIG. 1 is substantially axially coextensive with the crankshaft 28. As best seen in FIG. 3, the camshaft 36 has cam surfaces 38 each associated with either an inlet or exhaust valve and arranged to reciprocate a push rod 40 through a tappet assembly 42. The push rod 40 in turn is connected to a rocker arm assembly 44 arranged to open and close a valve assembly 46 associated with the cylinder assembly 20 in the manner well known to those skilled in the art. The engine 10 is a four-cycle engine so that the camshaft is geared to rotate at one-half the speed of the crankshaft.

Now referring back to FIG. 1, a hollow main driving output shaft 48 adapted to support a propeller (not shown) is mounted to the crankcase 18 for rotation about an extension of the axis of rotation of the camshaft 36.

The output shaft 48 and the camshaft 36 are joined together by a fastener member 50 so that they rotate as a unit.

The forward end of the crankshaft 28 is connected through a hydraulic coupling assembly 52 to a quill shaft 54 which is also mounted within the crankcase 18 and supported for rotation about a forward extension of the axis of rotation of the crankshaft 28. The hydraulic coupling 52 is described in detail in the aforementioned copending application and provides a vibration absorbing coupling between the crankshaft 28 and the quill shaft 54.

A gear 56 carried by the quill shaft 54 is in driving mesh with a gear 58 carried by the output shaft 48 and provides a speed reduction connection between the shaft 54 and the output shaft 48. The gears 56 and 58 provide a two-to-one speed reduction between the crankshaft 28 and the camshaft 36 so that the cams 38 of the camshaft 36 rotate to open and close the valve assemblies 46 in a timed relationship corresponding to the rotation of the crankshaft 28. Thus, it can be seen that the gears 56 and 58 provide a connection between the forward end of the crankshaft 28, and both the output shaft 48 and the camshaft 36 thereby reducing the number of gears utilixed in conventional engines that employ a separate gear set between the crankshaft and the output shaft and another reduction gear set between the crankshaft and the camshaft. This arrangement is particularly useful where the crankshaft rotates at a high speed such as 4,000 r.p.m. and it is necessary to reduce this high speed to a rotational speed compatible with the output shaft 48 and the camshaft 36.

A starting motor 60 laterally mounted to the crankcase half 14 is coupled to the quill shaft 54 through a clutch assembly 62.

Figure 2:
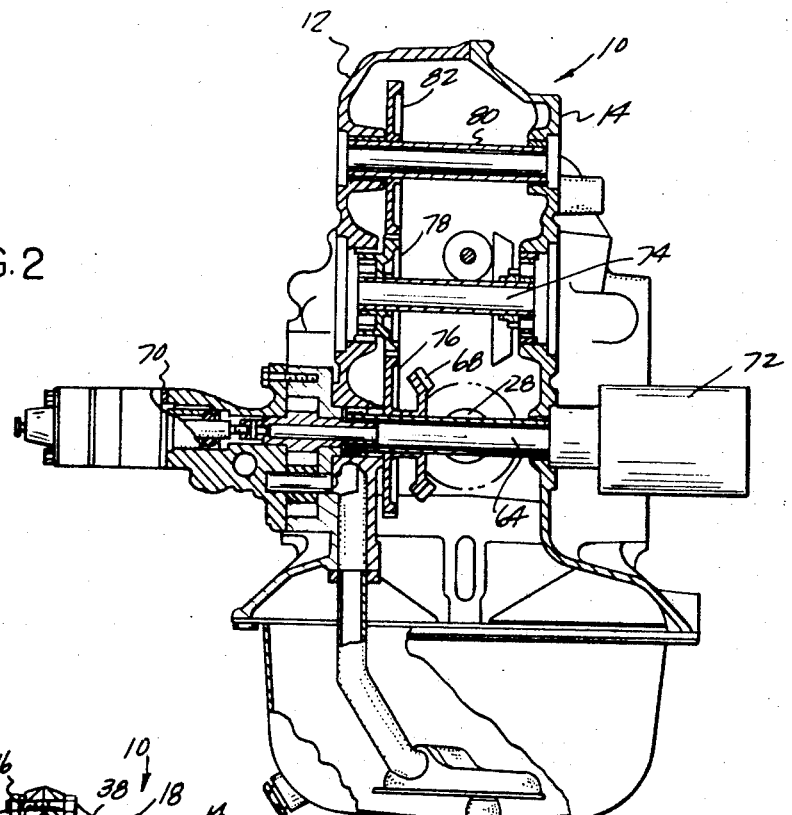
FIG. 2 is a transverse sectional view through the preferred engine as seen along lines 2—2 of FIG. 1.

Now as best seen in FIGS. 1 and 2, an accessory driveshaft 64 is mounted rearwardly of the crankshaft 28 and is supported by the crankcase halves 12 and 14 for rotation about an axis transverse to the axis of rotation of the crankshaft 28. A bevel gear 66 carried by the crankshaft 28 in driving mesh with a complementary bevel gear 68 carried by the accessory shaft 64 provides means for driving the shaft 64.

The opposite ends of the shaft 64 are drivingly coupled to a pair of side mounted accessories such as an oil pump 70 and a vacuum pump 72. The oil pump 70 is integrally mounted to the crankcase 12 while the vacuum pump 72 is integrally mounted to the crankcase half 14 so that there are no external connections between the crankshaft 28 and the accessories. Thus, it can be seen that the shaft 64 provides a common driving connection for a pair of sidewardly mounted accessories.

An intermediate shaft 74 is supported by the crankcase halves 12 and 14 above the accessory driveshaft 64 for rotation about a horizontal axis parallel to the axis of rotation of the shaft 64. A pair of gears 76 and 78 provide a driving connection between the shaft 64 and the shaft 74. The shaft 74 is intended to drive a pair of magnetos (not shown) which are also side mounted to the crankcase halves 12 and 14.

An upper accessory shaft 80, supported by the crankcase halves 12 and 14 is also preferably mounted for rotation about an axis parallel to the axis of shaft 64 and carries a gear member 82 which is meshed with the gear 78. The shaft 80 provides means for driving another pair of side mounted accessories (not shown) such as a governor and a hydraulic pump.

Thus, the preferred gearing arrangement reduces the overall number of gears required in an internal combustion engine by arranging the accessories such that each pair of accessories requires only a single shaft and gear. This arrangement provides other advantages over conventional engines in that by mounting the accessories sidewardly and at the rear portion of the engine, the overall length of the engine is substantially reduced, and a more streamlined configuration is achieved. In addition, there are no protrusions from the rear of the engine, and the engine can be mounted directly onto the fire wall of the aircraft without the intermediate structure that is normally required to provide clearance for accessories which are mounted on the rear end of conventional engines.

Although we have described but one preferred embodiment of our invention, it is to be understood that various changes and revisions can be made therein without departing from the spirit of the invention as expressed in the scope of the appended claims.

Having described our invention, we claim:

1. In an internal combustion engine, a crankcase, a crankshaft supported by said crankcase for rotation about a first axis, an engine cylinder assembly carried by said crankcase, a piston mounted for reciprocation in said engine cylinder assembly, means drivingly coupling said piston to said crankshaft to produce rotation of said crankshaft upon reciprocation of said piston, a main driving output shaft and a camshaft rotatably supported by said crankcase on a common second axis, said output shaft and said camshaft being coupled toegther end to end and said second axis being in a spaced parallel relationship with respect to said first axis, and stepped down gear means connecting said crankshaft and said output shaft whereby said output shaft is driven by said crankshaft at a reduced speed and said camshaft is driven by said output shaft at said reduced speed.

2. The engine as defined in claim 1 and in which said camshaft is substantially axially coextensive with said crankshaft.

3. The combination as defined in claim 1, wherein said gear means comprises a first gear driven by said crankshaft and a second gear carried by said output shaft in meshed relationship with said first gear.

4. The combination as defined in claim 1 wherein said gear means is disposed forwardly of said piston coupling means, and including an accessory gear train coupled to said crankshaft rearwardly of said piston coupling means.

5. The combination as defined in claim 4, wherein said first and second axes are arranged in a common vertical plane and including an accessory horizontally mounted to said crankcase, said accessory being drivingly coupled to said accessory gear train.

References Cited

UNITED STATES PATENTS

| | | | |
|---|---|---|---|
| 1,438,289 | 12/1922 | Barbarou | 123—90 |
| 1,449,029 | 3/1923 | Barbarou | 123—90 |
| 2,001,866 | 5/1935 | Caminez | |
| 2,021,262 | 11/1935 | Moore. | |
| 2,678,037 | 5/1954 | Wiegman et al. | |

FOREIGN PATENTS

| | | |
|---|---|---|
| 451,217 | 7/1936 | Great Britain. |
| 943,293 | 12/1963 | Great Britain. |
| 1,038,779 | 5/1953 | France. |

WENDELL E. BURNS, *Primary Examiner.*

U.S. Cl. X.R.

123—55, 56, 195